US006584903B2

(12) United States Patent
Jacobs

(10) Patent No.: US 6,584,903 B2
(45) Date of Patent: Jul. 1, 2003

(54) COLOR DIGITAL FRONT END DECOMPOSER OUTPUT TO MULTIPLE COLOR SPACES WITH ACTUAL OUTPUT OPTIONALLY BEING DETERMINED BY INPUT COLOR SPACES

(75) Inventor: William S. Jacobs, Los Angeles, CA (US)

(73) Assignee: Xerox Corporation, Stamford, CT (US)

( * ) Notice: Subject to any disclaimer, the term of this patent is extended or adjusted under 35 U.S.C. 154(b) by 352 days.

(21) Appl. No.: 09/737,217

(22) Filed: Dec. 12, 2000

(65) Prior Publication Data

US 2002/0069778 A1 Jun. 13, 2002

(51) Int. Cl.$^7$ ................................ B41J 11/44
(52) U.S. Cl. .......................... 101/484; 400/61; 400/70; 400/76
(58) Field of Search ..................... 101/484; 400/76, 400/70, 61; 358/1.9

(56) References Cited

U.S. PATENT DOCUMENTS 5,949,438 A * 9/1999 Cyman et al. .............. 345/502
6,010,261 A * 1/2000 Maekawa ................... 400/605
6,062,137 A * 5/2000 Guo et al. .................. 101/171
6,271,937 B1 * 8/2001 Zuber ......................... 358/1.9
6,469,805 B1 * 10/2002 Behlok ....................... 358/1.9

* cited by examiner

Primary Examiner—Charles H. Nolan, Jr.

(57) ABSTRACT

A print controller which produces a device specific raster for its printer and also produces a rasterized output in portable and more editable form for export and re-use as an input by other printers which may have different parameters. If the input is in a device independent color space, the rasterized export also will be in a version in a device independent color space, typically CIELAB. If the input is in a printable device dependent color space such as CYMK, the output will be an more editable rasterized version in the same color space, with any printing hints that were in the original will be included in the output. In any case, an override can be provided to change the default selection to any other user-identified version. An example of a device independent color space is CIELAB, of a device dependent version applicable for a number of printers with similar parameters is SWOP CMYK, and of a device dependent version is a printer specific CMYK.

7 Claims, No Drawings

COLOR DIGITAL FRONT END DECOMPOSER OUTPUT TO MULTIPLE COLOR SPACES WITH ACTUAL OUTPUT OPTIONALLY BEING DETERMINED BY INPUT COLOR SPACES

BACKGROUND OF THE INVENTION

An automatic program to decompose a page description language input either into a raster version which can be printed directly by a target printer or into a raster version which can be exported in a portable and more editable form to another printer.

In a typical printer, the print controller will accept input files in any of several page description languages (PDLs) and color spaces, decompose the submissions, and then raster image process (RIP) them into a raster image specifically rendered for output on that printer. For CMYK printers, these output raster images are in the printer's CMYK color space.

A problem arises when the same page must be printed, perhaps at a later date, on a different printer. Typically, for best image quality, the user must return to each page's original source elements and repeat the decomposition, rendering, and rasterizing for the new printer. Not only does this represent a significant amount of additional overhead but, since the original submission files may no longer be available, this procedure may not be possible.

As an alternative, a stored copy of the final rasterized page image fully rendered for one printer could be used at the second device. Unfortunately, doing so would involve a loss of image quality. First, conversion from one printer's color space to another's color space is an inherently lossy process. Second, in generating the initial raster image, any available rendering hints would have been applied and hence would no longer be available. Once such fully rendered, printable rasters have been generated, the images are targeted for output on a specific machine, thereby reducing portability to other printers and their subsequent editability.

Hence, where different printers are available, it would be useful if a decomposer could automatically produce both (1) a raster version suitable for printing on the local printer and (2) a portable raster version preserving available rendering hints for storage which later could be exported to another printer. Doing so would allow the second machine to print a high quality image with less image quality degradation and reduced time consuming processing. Also, because any rendering hint information has been preserved, the impact on the output images of subsequent edits will be reduced.

SUMMARY OF THE INVENTION

In a color printing system, the print controller will generate a raster image for immediate printing and/or a portable and more editable raster image for export to another printer. If the request is for immediate printing, the raster image will be in the printer's own color space (such as CMYK). If the request is for exporting the result, then the output raster typically will be in either the same CMYK color space as the input or in the portable device independent CIELAB color space. The output color space of exportable rasters can be determined either automatically from the input color space(s) or by user selection. PDL inputs in the CMYK color space will result in CMYK raster output, while PDL inputs in three valued color spaces (such as RGB or Lab) will be converted to CIELAB. On either alternative, any rendering hints will be preserved, thereby increasing image editability.

Also, when creating CMYK export raster images, different versions of the CMYK color space (e.g., different printer specific CMYKs, SWOP CMYK, etc.) will be preserved rather than being converted to the target printer's single version of CMYK. By selecting the color spaces of exportable raster images in this way, image quality will be improved.

DETAILED DESCRIPTION OF THE INVENTION

A print controller for a CMYK printer decomposes input PDLs, emitting output rasters to its printer in the printer's specific CMYK color space. In order to submit these rasters to a different printer, a color space transformation is required. Because this degrades image quality, portability is reduced. Also, because transforming diverse input color spaces to a single output CMYK color space loses information, particularly if an input file contains rendering hints, subsequent portability and editability is impacted.

To generate a portable, more editable output raster image (in addition to that going to the printer), the decomposer must have two components:

1. The color decomposition service will support multiple output color spaces (including printer specific CMYK, SWOP CYMK, and CIELAB), and
2. As a user option, the actual output color space will be automatically determined by the input color space(s).

Prior to raster image processing, users will be asked whether to decompose for high print performance (in which case printer specific CMYK files will be generated) and/or for portability (in which case files in device independent CIELAB (possibly still containing input rendering hint information) and various CMYK color spaces (such as SWOP CMYK) will be produced). In the latter case, different color spaces will be allowed, with the actual result being automatically determined by the input color space(s) or by user selection. In general, CMYK inputs will not be transformed, while all other color spaces will be converted to CIELAB. Only if later printed will such decomposer outputs be rendered into a particular device's CMYK.

When submitting jobs to a print controller, a number of different formats can be used (e.g., PCL, PostScript, PDF, TIFF, etc.) in a variety of color spaces (e.g., printer specific CMYK, SWOP CMYK, RGB, CIELAB, etc.). The function of the decomposer is to convert these submissions, possibly involving multiple components per page, into a single rasterized output image for each page able to drive a print engine, and also support the export of these images.

In current practice, color decomposers convert output raster images targeted for a CMYK printer to the CMYK color space. Submissions in SWOP CMYK, RGB, CIELAB, etc., all are transformed to the printer's specific CMYK, during which process any present rendering hint information is applied. The resulting output image files then contain the CMYK data needed to drive the printer's marking facility.

While well suited to generating the data needed to drive a specific CMYK printer, this procedure has limitations. Since the output image files are targeted to a particular print engine, submission to a different CMYK device requires color adjustments, thereby negatively impacting image quality and reducing portability. In addition, rendering device independent CIELAB inputs containing hints to CMYK loses information, thus affecting any later edits of these files in a CIELAB based workflow.

As an alternative to current practice, the decomposition service might convert all inputs to a single device independent color space such as CIELAB. Though such output files are not targeted to a specific printer and are amenable to subsequent edit, other problems would result. In order to optimize color image quality, a common graphic arts industry practice is to create, often with considerable effort, CMYK files targeted for a specific printer. Since converting from the four dimensional CMYK color space to a three dimensional color space such as CIELAB is inherently lossy, users who have generated such files will be distressed by the resultant image quality degradation. Moreover, because CIELAB decomposer output files still must be converted to CMYK for printing, performance will suffer.

In short, if the color decomposer only exports rendered printer specific images, image portability and edit flexibility will suffer, while only generating unrendered device independent CIELAB images will degrade CMYK input file image quality and print performance. Since no single decomposition service output color space suffices to preserve image quality, portability, editability, and performance, alternative color spaces are required.

Where immediate printer speed is the paramount objective and neither redirection to a different printer nor further edit are factors, the current practice of decomposition to printer specific CMYK is preferable. Where re-targetability, re-use, and re-purposing are significant, a different strategy is needed, with the decomposition service generating output files supporting such uses without sacrificing image quality.

Implementing this new decomposer path will require that the decomposition service be able to pass through files in CIELAB with rendering hints, SWOP CMYK, or printer specific CMYK without color space conversion or rendering. Should the user choose, a page image's output color space will be determined by its input color space(s). Prior to generating each output raster page, the decomposer will examine its component inputs. If the PCL, PostScript, PDF, and TIFF components use only three valued color spaces (such as CIELAB and sRGB), the output color will be in CIELAB and, where appropriate, still include rendering hint information. With minimal image quality impact, these files can readily be either further edited within a CIELAB based workflow or sent to a different printer. Only those pages containing CMYK inputs will yield CMYK results, thereby allowing preservation of any user CMYK optimizations. Wherever possible, to maintain image quality, CMYK images will be exportable without any color space transformation (such as from SWOP CMYK). If subsequently printed, all such CIELAB and non-printer specific CMYK decomposer outputs must be rendered into the printer's CMYK.

While this approach suffices for most cases, output pages generated from multiple inputs or with text annotations can introduce certain complexities. For example, when two images, one with and the other without rendering information, are merged, only part of the resulting output page might preserve hints. Or again, if a single page contains both SWOP and printer specific CMYK files, transforming to CMYK inputs is unavoidable. In such situations, compromises will be required and user choices must be made. Also, as an additional feature, a user override option can be provided to allow output to either CIELAB or a different color space.

In this way, this new additional color decomposition method will allow preservation of image quality, portability, and editability at the possible price of reduced performance. When incorporated into a decomposer, it will be a critical enabler for portability of files between printers.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In a printer process which uses a raster image process for transforming a page description language input comprising an input image into a device specific raster for printing, a process for producing a second output which can be used as an input to another printer, comprising:

if the input image is in a device independent color space with rendering hints, RIPping the image to a device independent color space output with rendering hints, or if the input image is in a device specific color space, RIPping the image to an output of the same color space.

2. The process of claim 1 wherein the device specific color space is appropriate to a number of different kinds of printers that have a similarity in one or more parameters.

3. The process of claim 1 wherein the process is adapted to be changed to produce a second output in any color space.

4. The process of claim 1 wherein two images in different color spaces on the same input page are converted to a second output in one color space.

5. The process of claim 1 wherein the second output device specific color space is CMYK.

6. The process of claim 1 wherein the device independent color space is a three color space.

7. The process of claim 1 wherein the device independent color space is CIELAB.

* * * * *